LAWRENCE & QUICK.
Corn Planter.
No. 83,979.   Patented Nov. 10, 1868.
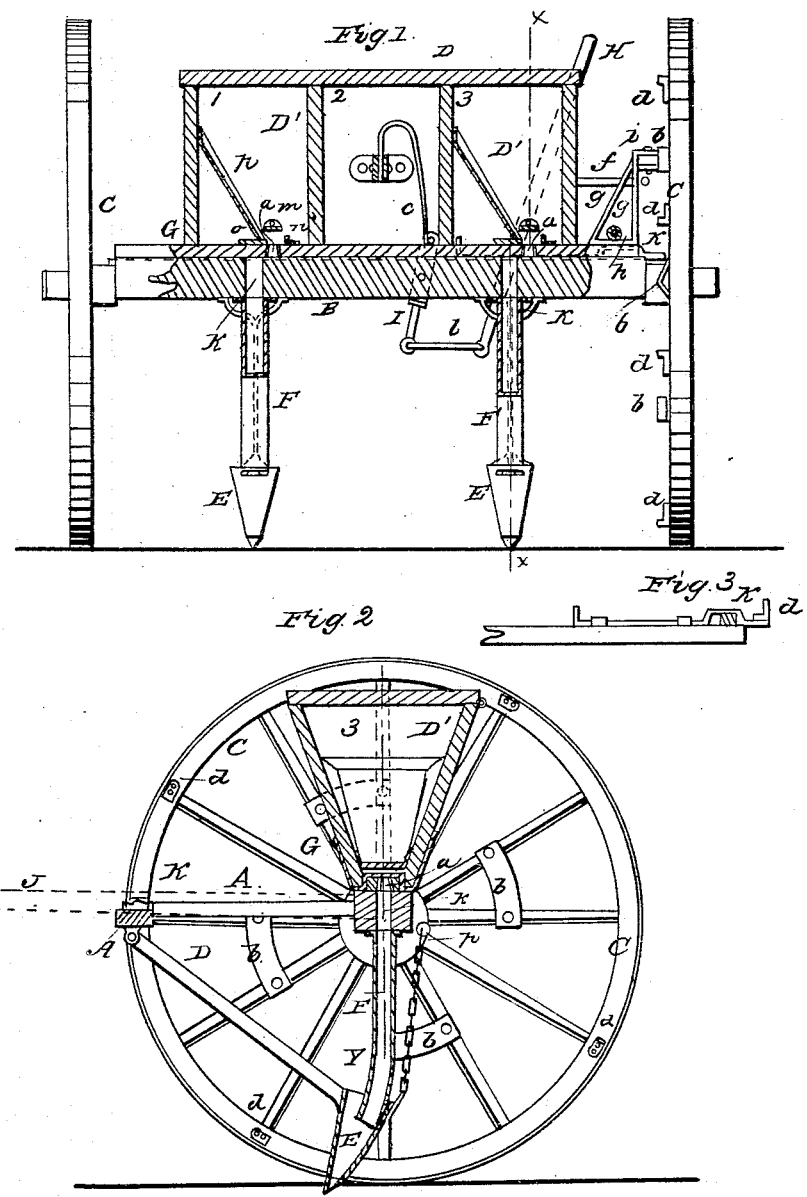
WITNESSES
INVENTOR

E. B. LAWRENCE AND C. QUICK, OF LAKEVILLE, OHIO.

Letters Patent No. 83,979, dated November 10, 1868.

IMPROVEMENT IN CORN-PLANTERS.

The Schedule referred to in these Letters Patent and making part of the same.

*To all whom it may concern:*

Be it known that we, E. B. LAWRENCE and C. QUICK, of Lakeville, in the county of Holmes, and State of Ohio, have invented certain new and useful Improvements in Corn-Planters; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use our invention, we will proceed to describe it.

This invention relates to an improved automatic corn-planter, of that class in which the seed-hopper is secured in a suitable frame, and the whole mounted upon wheels, the furrow being opened by drill-teeth, through which the corn is dropped into the furrow, by suitable apparatus, operated by the wheels, all as hereinafter more fully described.

In the drawings—

Figure 1 is a transverse vertical section, taken on a line passing through the centre of the seed-hopper.

Figure 2 is a transverse vertical section, on the line x x of fig. 1.

In the drawings, A A' represent a rectangular wooden frame, provided with a tongue, J, and secured to the front side of the large rectangular shaft or axle B, upon each end of which axle is attached a wheel, C.

Upon top of the axle B is secured rigidly a long seed-hopper, D, which hopper is divided, by stationary partitions, into three compartments, 1, 2, and 3.

On the under side of the hopper, between it and the axle, is placed a longitudinally-reciprocating seed-slide, G, to feed the corn from the hopper to the drill-teeth.

This slide extends out some distance to one side of the hopper, as shown in fig. 1, and has rigidly attached to it a vertical arm or bracket, g, which bracket has attached to its upper end a horizontal anti-friction roller, i, as shown in fig. 1.

Bolted to the spokes of the wheel C, equidistant from one another and from the centre of the wheel, is a series of cams or blocks, b, which, when the wheel revolves, strike against the roller i, and force the arm g, and, with it, the slide G, over, in a direction away from the wheel.

As soon as the cam passes the roller i, the slide is returned to its original position by the spring c, secured in the chamber 2 of the hopper, and one end of which engages in a hole in the seed-slide, as shown in fig. 1.

The outward movement of the slide is limited by the frame f, against which the arm g strikes when the slide has moved a sufficient distance.

Any tendency there may be of the slide to lift or rise, when a cam strikes the roller i, is counteracted or prevented by the stationary roller h, under which the end of the slide runs, as seen in fig. 1.

In the slide G, we make two holes or pockets, a, one in each end, opposite the bottoms of compartments 1 and 3 of the seed-hopper, as shown in fig. 1, and, through the axle, two vertical holes or openings, k, in such positions that, when the slide is shoved back by either of the cams b, the holes in it shall be immediately over the openings k in the axle.

Inside of the seed-hoppers 1 and 3, above the slide, we secure two plates, o, in a vertical line, above the openings k in the axle, so that, when the slide is out in its natural position, the holes a will fill with corn from the hopper, but, when the slide is carried over by a cam, the plates will cut off the feed from above, and, when the openings a arrive over the mouths of the holes k, the corn will drop down through them into the flexible tubes F, and thence through the hollow drill-teeth into the furrow.

The machine being thus constructed, when drawn across the field, will drop a "hill" of corn each time a cam strikes the roller i. The drawing shows four of these cams attached to the wheel, in which case the machine will "drop" four times to each revolution of the wheel C.

The distance apart that the hills are to be dropped is varied by changing the number of cams on the wheel.

It will sometimes happen, in planting, that, after turning the machine around, the wheel C will not be in a proper position to "drop" at the required point. To provide against this, we pivot to the front side of the axle a hand-lever, H, the lower end of which projects a short distance below the axle, and is connected by a link, l, to the lower end of a lever, I, which latter is pivoted, near its middle, to the axle B, and is connected at its upper end to the seed-slide, so that, when lever I is operated through the medium of lever H, it will operate the slide, and the machine drop by hand.

When it is desired that the machine shall not drop, as when going to or coming from the field, then the lever H is drawn back, and held by any suitable catch, thus holding the roller I back where the cams will not strike it.

When it happens that the wheel C is not in the proper position to "drop" at the required spot, it is necessary to check it, and cause it to drag until it comes in position. To do this, we secure to the inner side of the wheel a series of lugs or stops, d, as many in number as the cams b, and to the upper side of the front cross-bar of the frame we attach a sliding bar, K, one end of which will, when the bar is slid out, strike against one of the series of stops d, and thus prevent the further rotation of the wheel, which is dragged until the drill-tooth nearly reaches the spot where the corn is to be dropped, when the bar K is drawn back by the foot of the operator, who sits on top of the hopper, with his feet resting upon the cross-bar A'; the stops d being in such positions that, when any one of them is bearing against bar K, a cam shall almost have reached the roller i, so that the seed-slide shall be operated the instant after the wheel C is released, thus enabling the operator to regulate the machine very closely.

The openings *a* are made larger at the bottom than at the top, so that the corn will readily fall through.

It is evident that any number of drill-teeth may be used, and that the cams *b* and stops *d* may be detachable or not.

Having thus described our invention,

What we claim, is—

1. The seed-slide G, provided with the arm *g*, arranged to be operated by the cams *b* upon the wheel C, substantially as described.

2. The stops or lugs *d*, secured to the wheel C, in combination with the lock-bar K, arranged to operate as described.

3. The combination of the slide G and the levers H and I, arranged as shown and described.

E. B. LAWRENCE.
C. QUICK.

Witnesses:
J. O. BUTLER,
C. M. LOVETT.